(12) United States Patent
Mangano et al.

(10) Patent No.: US 7,721,623 B2
(45) Date of Patent: *May 25, 2010

(54) HANDLEBAR FOR CYCLES AND MOTORCYCLES

(75) Inventors: Antonio Mangano, Turin (IT); Giuseppe Mangano, Turin (IT)

(73) Assignee: Hi-Line S.R.L., Grugliasco (Turin) (IT)

( * ) Notice: Subject to any disclaimer, the term of this patent is extended or adjusted under 35 U.S.C. 154(b) by 1579 days.

This patent is subject to a terminal disclaimer.

(21) Appl. No.: 10/974,795

(22) Filed: Oct. 28, 2004

(65) Prior Publication Data

US 2005/0199089 A1    Sep. 15, 2005

(30) Foreign Application Priority Data

Mar. 15, 2004    (EP) .................................. 04425173

(51) Int. Cl.
*B62K 21/26*    (2006.01)
(52) U.S. Cl. ..................................... 74/551.9
(58) Field of Classification Search ..... 74/551.1–551.9; 29/897.2

See application file for complete search history.

(56) References Cited

U.S. PATENT DOCUMENTS

| | | | |
|---|---|---|---|
| 2,666,340 A | | 1/1954 | Hunt |
| 3,716,649 A | * | 2/1973 | Smith et al. .................... 174/7 |
| 4,260,171 A | * | 4/1981 | Foster ......................... 280/279 |
| 5,083,476 A | * | 1/1992 | Borromeo .................. 74/551.1 |
| 5,487,709 A | | 1/1996 | Froelich et al. |
| 6,035,742 A | | 3/2000 | Hollinsworth et al. |
| 6,182,528 B1 | | 2/2001 | Renshaw |
| 6,421,879 B1 | | 7/2002 | Gratz et al. |
| 7,350,437 B2 | * | 4/2008 | Mangano et al. ........... 74/551.1 |
| 2004/0036194 A1 | | 2/2004 | Chadwick et al. |

FOREIGN PATENT DOCUMENTS

| | | |
|---|---|---|
| DE | 3540558 A1 * | 5/1987 |
| EP | 1 577 204 | 9/2005 |
| WO | WO 00/21824 | 4/2000 |
| WO | WO 0021824 A1 * | 4/2000 |

* cited by examiner

*Primary Examiner*—Vicky A Johnson
(74) *Attorney, Agent, or Firm*—Bacon & Thomas, PLLC

(57) ABSTRACT

The handlebar for motorcycles (11; 111; 211) according to the invention comprises a light alloy bent tube (2110) to an end of which a twist grip (M) of the motorcycle accelerator can be set. Said end is externally covered by a layer of sliding material substantially harder and more abrasion resistant than the light alloy of said bent tube. Preferably said layer of sliding material comprises a tubular fixed sleeve (263) fitted on said end of the bent tube. The layer of harder material allows better sliding of the twist grip on the light alloy tube end and avoids seizing up thereof.

19 Claims, 4 Drawing Sheets

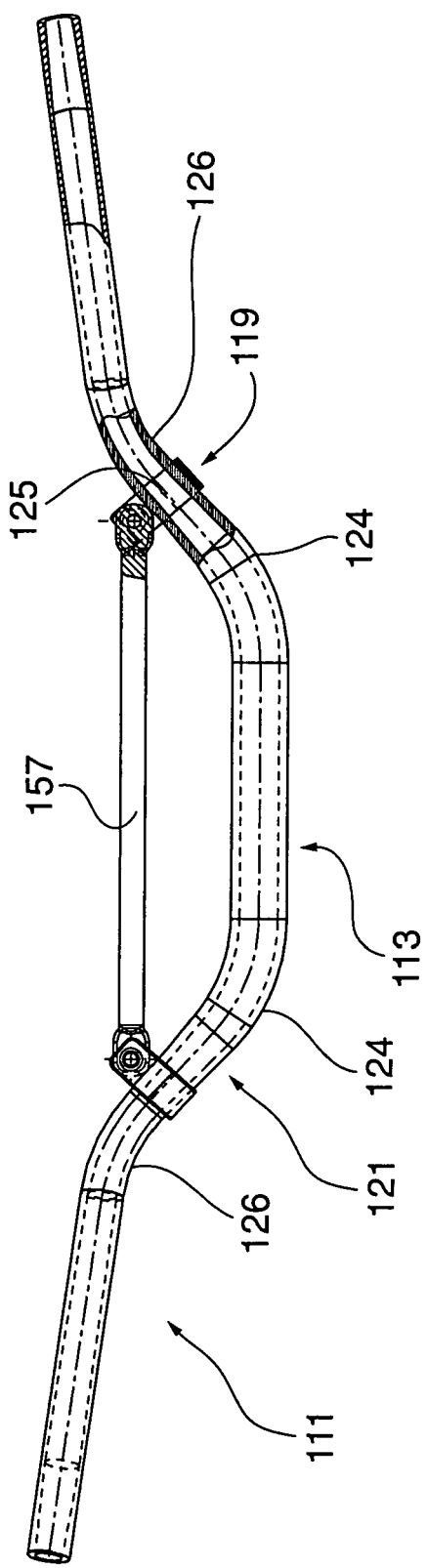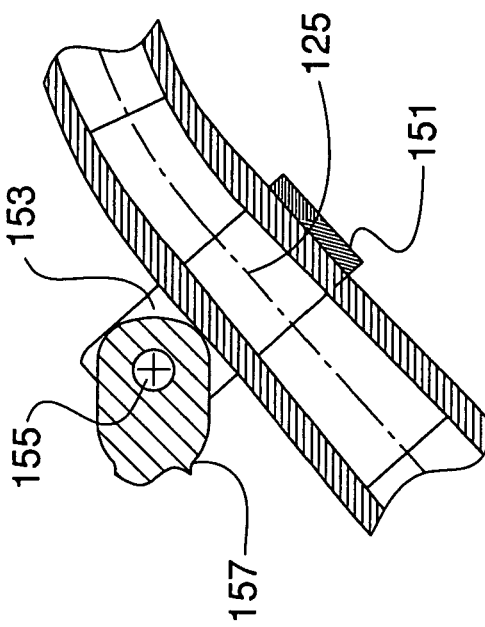

HANDLEBAR FOR CYCLES AND MOTORCYCLES

FIELD OF THE INVENTION

The present invention concerns a handlebar for cycles or motorcycles such as motorbikes for motocross and off-road competitions. However a handlebar according to the present invention can be used also on other kinds of two- three- or four-wheels motorcycles.

BACKGROUND ART

The handlebars for motorcycles generally comprise a bent-iron tube so as to define a median section for fixing the handlebar to the fork head, said fixing generally occurring by means of an appropriate bracket, of two end sections for holding the handlebar and of two intermediate linking sections.

As it is known, all the components of the frame of motorcycles for cross-country use must have high resistance as they suffer high intensity shocks and stresses.

It is also known the fact that motorcycles, and in particular racing motorcycles, must generally have light structure for improving their performance and their ease of drive.

However, these two needs are often in opposition since the use of lighter materials or of lightened structures can sometimes jeopardise the resistance of the motorcycle's components.

One of the motorcycle's components that during these last years for the above mentioned grounds has undergone lightening interventions is for instance the handlebar.

Recently, particularly light handlebars having an high capability of absorbing vibrations and made of aluminium alloy have been introduced.

The inventors of the present invention noted that, in particular in handlebars for cross-country motorcycles or in general motorcycles for off-road use, dirt such as earth and mud penetrate in the spaces between the handlebar aluminium structure and the cylindrical control sleeve of the accelerator. That, since control sleeve of the accelerator is usually made of plastic or metal and since aluminium does not help an easy sliding and is quickly damaged by abrasion, makes the sliding of the accelerator sleeve on the handlebar more and more difficult, and in some case can even completely blocks and seizes the sleeve up.

However, in particular in motorbike competitions, it is desired reducing as much as possible the friction between the accelerator sleeve and the support on which the sleeve rotates, so as to achieve the best sensibility of the accelerator twist grip.

An object of the present invention is providing a light alloy handlebar for cycles or motorcycles that allows a better operation of the accelerator twist grip, or of other accelerator control elements, in spite of earth—and mud penetration between the light alloy handlebar structure and the rotatable accelerator control sleeve.

SUMMARY OF THE INVENTION

According to a first aspect, the present invention is directed to a handlebar for cycles or motorcycles comprising a light alloy bent tube to an end of which a twist grip of the motorcycle accelerator can be set, wherein said end is externally covered by a layer of sliding material substantially harder and more abrasion resistant than the light alloy of said bent tube.

The harder layer is less damaged and scratched by dirt, earth and mud particles, and hence allows an easier sliding of the rotatable accelerator sleeve on the end of the light alloy tube, without progressive degradation in the time; moreover dirt and mud particles rather slip on the hard material rather than engraving it, hence seizing up is avoided or however much less frequent.

In a first preferred embodiment, the layer of sliding material comprises a tubular fixed sleeve fitted on said end of the bent tube.

Some particular embodiments are also directed to the further following problems.

Another problem of known light alloy handlebars are breakages due to the heavy stresses they undergo during a motocross—or however off-road competition.

In order to solve this inconvenience, handlebars with variable diameter or thickness have been proposed in the past for limiting the weight in the less stressed sections and for increasing the resistance in the sections subject to breakage to a greater extent.

U.S. Pat. No. 5,117,708 describes for instance a strengthened handlebar for motorcycles showing a central section having a greater diameter, two end sections having a standard diameter and two tapered linkage sections.

U.S. Pat. No. 5,257,552 describes a handlebar having variable diameter and thickness wherein the central section has a diameter and a thickness greater than the end sections.

U.S. Pat. No. 5,832,785 describes a handlebar having a constant diameter wherein the thickness is internally increased in the central section.

U.S. Pat. No. 5,950,497 describes a handlebar having variable diameter and constant thickness wherein the diameter of the central section is greater than the diameter of the end sections and wherein the linking sections have a tapered diameter.

The handlebars so realised provides two advantages: on the one hand, they are high resistant in the zone of connection to the fork head and, on the other hand, they are easy to manufacture.

However, the handlebars according to the prior art do not completely solve the problems of weight and of elasticity that are particularly important for the racing motorcycles.

The elasticity of the handlebar is in fact a particularly important aspect as a good elasticity guarantees two advantages: on the one hand, the handlebar turns out to be less subject to sudden yielding (breakage or bending) provoked by the very high loads occurring in case of particularly violent shocks due to jumps or falls; on the other hand, it absorbs better the vibrations and the stresses due to the ground roughness, said stresses, when using a rigid handlebar, being transmitted to the pilot's limbs and making the drive much harder.

On the contrary, a handlebar with the right elasticity makes a hard task lighter and increases the pilot's performance.

The handlebars realised according to the described prior art further are affected by the inconvenience of having a not optimally distributed resistance as they sometimes result to be fragile in correspondence with the zones subject to high loads and therefore more critical zones, while they are excessively strong in less critical zones, said handlebars thereby often resulting excessively heavy.

Moreover, the handlebars so realised are often very thin in correspondence with their ends for limiting their weight and this makes difficult the fixing of accessories for protecting the hands ("hand guards") which are blocked by means of expansion terminals on the handlebar ends, as it is described for instance in U.S. Pat. No. 4,141,567.

On the contrary, it is more and more felt the need of obtaining components for racing motorcycles having less weight, high shock resistance and good elasticity.

Therefore an object of a second preferred embodiment is providing for a handlebar for motorcycles which is light, resistant and elastic.

According to this second preferred embodiment, a handlebar for motorcycles is provided, wherein said light alloy tube is bent so as to define:

- a median section comprising a central portion having a diameter $d_{23}$ and a thickness $s_{23}$ for fixing the handlebar;
- two end sections, each of them presenting a central portion having a diameter $d_{27}$ and a thickness $s_{27}$ for holding the handlebar; and
- two intermediate sections, each of them comprising a central portion having a diameter $d_{25}$ and a thickness $s_{25}$ linking to said median section in an internal bending zone and to one corresponding of said end sections in an external bending zone having a thickness $s_{26}$; said handlebar having variable diameter and thickness, wherein said thickness and said diameter vary according to the following law:

$$d_{23} > d_{25} > d_{27}$$

and the thickness of the handlebar varies according to the following law:

$$s_{26} > s_{23} > s_{25} > s_{27}.$$

The handlebar according to such second preferred embodiment has a varying diameter and a varying thickness along the axis of the handlebar according to a law allowing to reach a right compromise between the need of obtaining an high resistance in the zones more subject to stresses and an high elasticity in presence of dynamic stresses, while obtaining at the same time a mass lower than the mass of the handlebars now in commerce.

A further advantage of said second preferred embodiment is that it is possible to obtain a further straightened version of the handlebar thanks to the possibility of mounting a strengthening crossbar anchored to the intermediate linking sections or by means of two clamps presenting an inverse taper with respect to the taper of the handlebar in the fixing zone, or by defining on the handlebar corresponding cylindrical portions in said intermediate linking sections in order to simplify the fixing of the clamp.

In a second aspect, the present invention is directed to a method of manufacturing a handlebar as defined above, wherein said tubular fixed sleeve is fixed at least by gluing on at least an end of said light alloy tube.

Some non-limiting embodiments of the invention will be now described by way of example with reference to the hereby attached figures.

LIST OF FIGURES

FIG. 2A shows an enlarged detail of FIG. 2;

FIG. 4 is a sectional front view of the handlebar according to a third embodiment of the present invention;

FIG. 5 is an enlarged view of a particular of the handlebar of FIG. 4.

DETAILED DESCRIPTION

Figure 1:
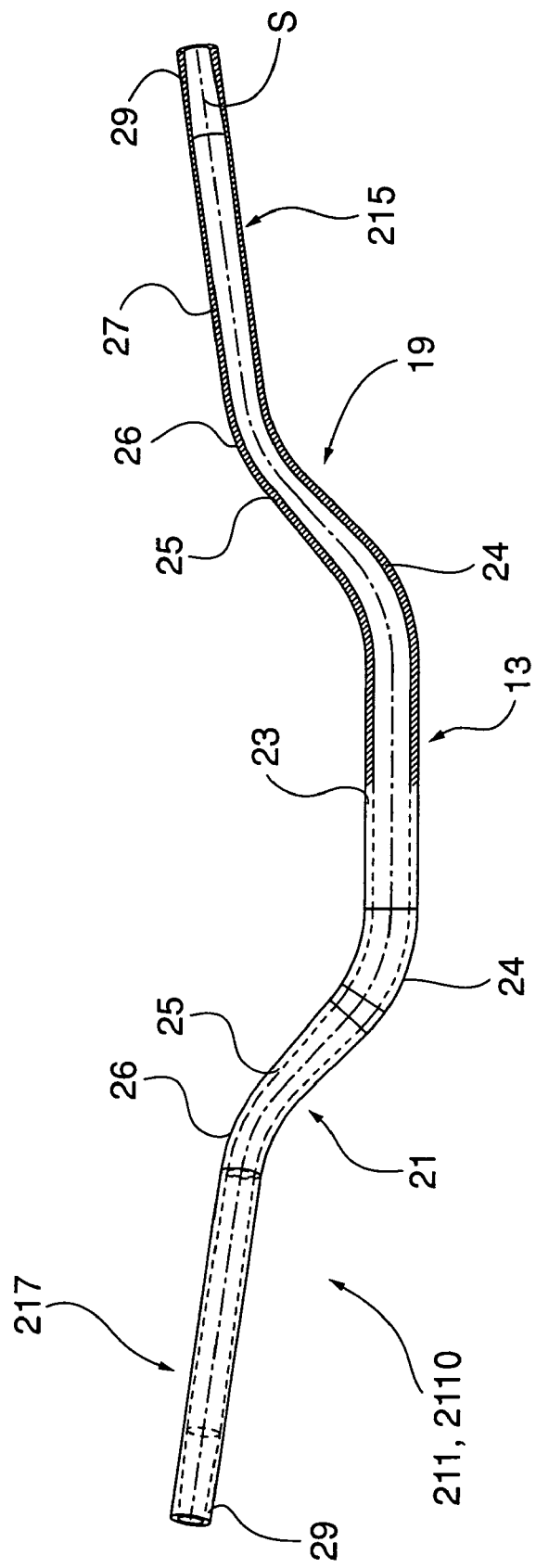
FIG. 1 shows a sectional front view of the handlebar according to a first embodiment of the present invention.
Figure 2:
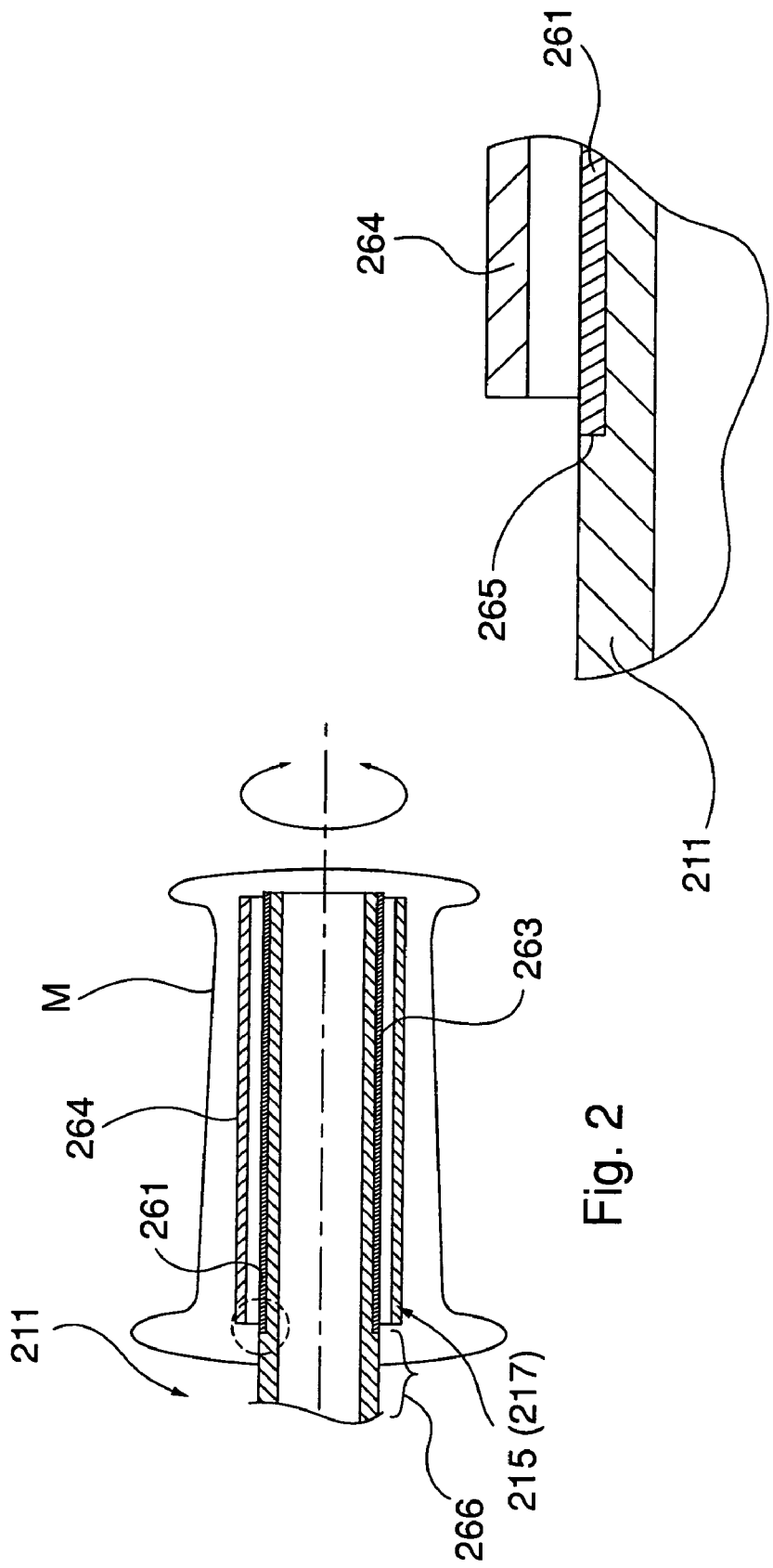
FIG. 2 shows a sectional view of a particular of the handlebar of FIG. 1.

With reference to FIGS. 1 and 2, a handlebar 211 is shown, realised according to a first embodiment of the present invention.

Said handlebar 211 comprises a bent tube of light alloy 2110, for example a suitable aluminium alloy; a tubular sleeve 263—referred to as "fixed sleeve 263" in the following—is fitted on at least one of the two ends 215, 215 of the tube 2110; the whole fixed sleeve 263, or at least its outer surface, is made of a material—referred to as "sliding material" in the following—substantially harder and more abrasion resistant than the light alloy of the rest of the tube 2110.

In the example shown the fixed sleeve 263 is about 100 mm long and about 1 mm thick; however the sleeve 263 can be also thicker or thinner than 1 mm—for example 0.1-0.3 mm or 0.1-0.6 mm thick—and longer or shorter than 100 mm.

Preferably the tubular fixed sleeve 263 is made of stainless steel, steel, titanium alloys or suitable composite materials, for example a carbon fibre—or KEVLAR based composite comprising suitable organic resins. The accelerator twist grip M (FIG. 2) of a motorbike or of another motorcycle can be fitted on the sleeve 263 and can rotate and slide on it.

Usually the accelerator twist grip M comprises an inner sleeve 264—or however a tubular sleeve, referred to as "rotatable sleeve 264" or "accelerator sleeve 264" in the following—made of plastic or sometimes in aluminium, suitable for rotating and sliding or rubbing on the light alloy handlebar tube.

This way aluminium—or light alloy handlebars can be obtained, that are very light, suitable for supporting the accelerator twist grip but are not affected by increasing friction between the twist grip accelerator sleeve and the aluminium surface of the handlebar and by seizing up. In fact the hard surface of the fixed sleeve 263 can be damaged in lesser extent by abrasions and scratching due to dirt and mud penetrated between the accelerator sleeve 264 and handlebar tube 2110, therefore on the one hand the resistance to rotation of the twist grip M is more constant in the time and the rotation is smoother and fluid; on the other hand dirt, mud and ground particles rather slip on the hard surface of the fixed sleeve 263 than scratching and engraving it, so reducing the probability of seizing up. Therefore the motorbiker can benefit from all the advantages deriving from the above even after several operation hours, expecially in competitions.

Moreover the handlebar needs to be replaced less frequently.

Preferably the fixed sleeve 263 is fitted on a fitting seat 261—in the present example a cylindrical seat 261 defined by a length having a smaller diameter and an axial shoulder 265 (FIG. 2A) against which the sleeve 263 can rest in a precise axial position when assembled on the tube 2110.

Preferably the fixed sleeve 263 is substantially as thick as the depth of the cylindrical seat 261, so that the outer surface of the handlebar end portion, by the seat 261, is substantially without steps.

In the shown example the fixed tubular sleeve 263 has a length of about 100 mm; nevertheless other lenghts can be chosen.

Advantageously the fitting seat 261 is made by turning on a suitable lathe or machining center: this way the fixed sleeves 263 can be derived from standard commercial tubes substantially with no need of further finishing operations for reducing the tolerances of the inner diameter thereof—said tolerances usually can range for example between 0.2 and 0.6 mm. In fact the cylindrical seat 261 can be turned setting the nominal value and tolerance of its outer diameter according to the inner diameter tolerances of each lot of standard commercial tubes from which the fixed sleeves 263 are derived, so as to obtain radial tolerances between the fitting seat 261 and the fixed sleeve 263 smaller than 0.1 mm or however more generally smaller than the tolerances of standard commercial tubes.

Advantageously the tubular sleeve 263 is fixed on the seat 261 by gluing: this allows connecting the two parts with the radial tolerances obtained with the above described manufacturing method or, more generally, in spite of radial tolerances not very precise with no need of further finishing operations; working methods such as welding or soldering require smaller coupling tolerances.

Preferably but not necessarily the handlebar 211 is derived from a bent tube 2110, preferably made of aluminium alloy and having circular cross-section, and comprises a median section 13 for fixing the handlebar 211 at the vehicle's fork head, two end sections 215, 217 for gripping the handlebar and two intermediate sections 19,21 for linking the central section 13 and the two end sections 215, 217.

Preferably but not necessarily, both the diameter and the thickness of the handlebar 211 vary along the longitudinal axis S of the handlebar in order to define a portion 23 of diameter $d_{23}$ and thickness $s_{23}$ at the centre of the median section 13 and comprising inner bending zones 24, a portion 25 substantially at the centre of the intermediate sections 19,21 having a diameter $d_{25}$ and a thickness $s_{25}$, a portion 26 corresponding respectively to the external bending zones and having a diameter $d_{26}$ and a thickness $s_{26}$, a portion 27 at the centre of the end sections 215, 217 having a diameter $d_{27}$ and a thickness $s_{27}$, and a portion 29 at the free end of said end sections 215, 217 having a diameter $d_{29}$ and a thickness $s_{29}$ and length of about 50 mm.

According to this first embodiment of the present invention, the diameter of the handlebar varies according to the following law:

$$d_{23} > d_{25} > d_{27}$$

and the thickness of the handlebar varies according to the following law:

$$s_{26} > s_{23} > s_{25} > s_{29} > s_{27},$$

wherein preferably $d_{29} \cong d_{27}$.

Moreover, the two intermediate linking sections 19,21 are tapered and have a diameter continuously decreasing as one moves away from the central section 13 towards the corresponding end sections 215,217.

In one embodiment of the handlebar according to the present invention, the bent tube has a diameter $d_{23}$ of about 28 mm and a diameter $d_{27}$ of about 22 mm, the diameter $d_{25}$ being intermediate between said two values.

Again according to said embodiment, the bent tube has a thickness $s_{26} \cong 5.2$ mm, $s_{23} \cong 4.5$ mm, $s_{25} \cong 4.2$ mm, $s_{29} \cong 4.0$ mm and $s_{27} \cong 2.8$ mm.

That is, according to the above described embodiment, the diameters and the thickness of the tube 2110 are such to provide on the one hand greater robustness in the critical handlebar points and, on the other hand, optimal elasticity and lightness.

In fact, the zones wherein the stresses are more concentrated, and therefore the zones more subject to yielding due to breakage or permanent buckling, are the zones in correspondence with the fork actuating plate and the zones corresponding to the bendings of the handlebar. Besides, these latter zones, given their geometry and because of the weakening due to the stress of the material during the bending, often turn out to be less resistant with respect to the remaining parts of the handlebar and therefore need to have an appropriate thickness.

Thanks to the above described diameter and thickness variation, it is possible to optimise the behaviour of the handlebar while maintaining a high resistance in the bending and actuating zones. In particular, in the external bending zones shown in FIG. 1 with the reference 26 the weakening due to the reduced diameter is counterbalanced by the increase of the thickness. In fact, in these zones the thickness of the material results to be greater than the remaining parts of the handlebar.

Always according to the present invention, the handlebar 211 advantageously comprises a portion 29 of increased thickness (about 4.0 mm) in correspondence with the free ends of the handlebar, for about 50 mm in extension, for fixing expansion inserts, for instance for fixing hand guards.

The handlebar so obtained optimises resistance to buckling, elasticity and lightness. In particular, the resistance is varied as a function of the stresses to which the handlebar is subject in the different sections during the use, so as not to uselessly increase the weight of the handlebar in little stressed zones and to maintain an high resistance in the zones subject to stresses to a greater extent. In this way, even by maintaining the handlebar light, there are obtained greater flexibility and elasticity with respect to the known handlebars and optimal absorption of those shocks due to the ground roughness, to the jumps and to the falls, that are typical of the cross-country use of motorcycles.

Figure 3:
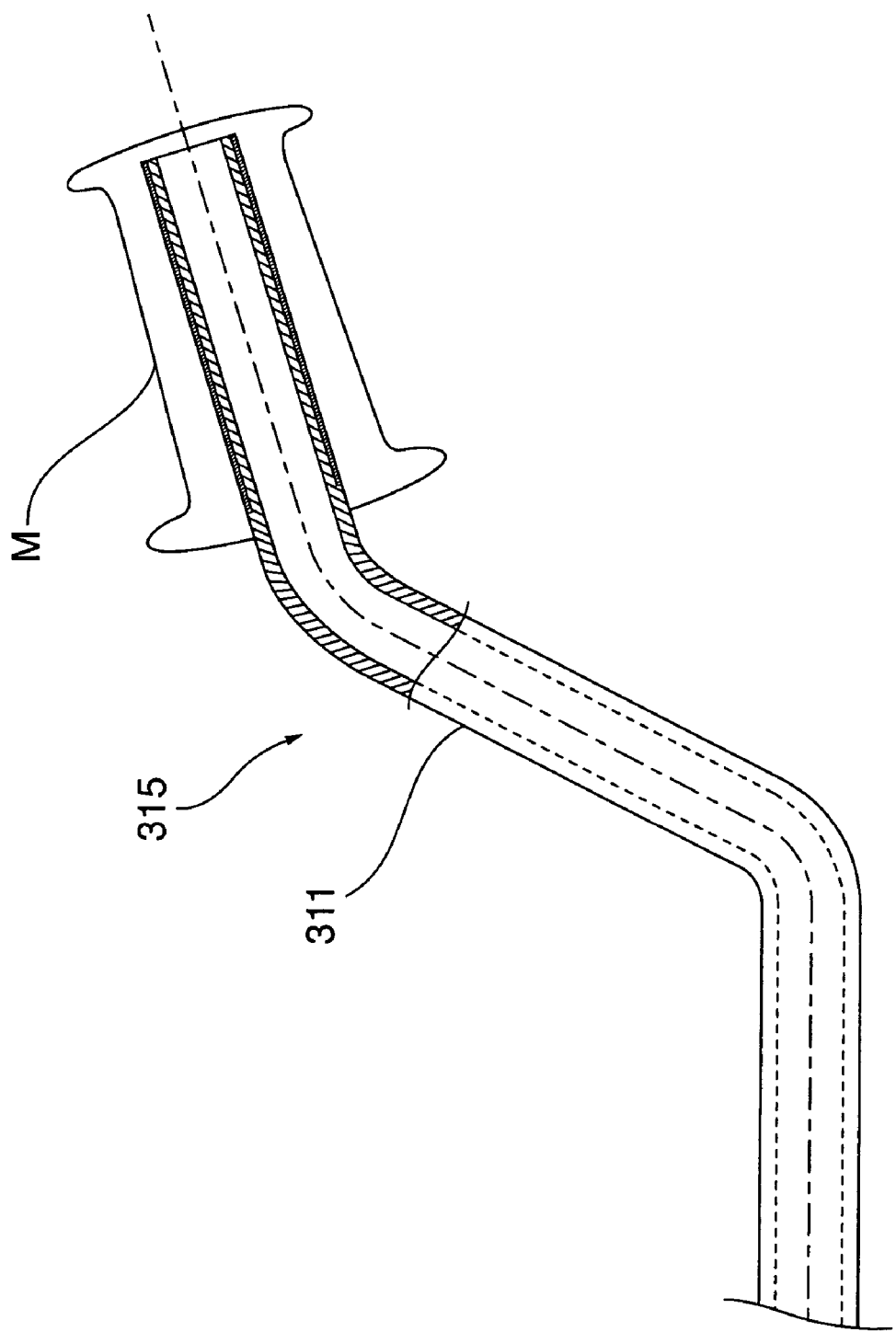
FIG. 3 is a sectional front view of the handlebar according to a second embodiment of the present invention.

Nevertheless a handlebar light alloy tube according to the present invention can have cross sections which are substantially constant along the tube itself (FIG. 3) in shape and dimensions—namely in diameter, in case of circular cross-section light alloy tubes—or which vary according to different laws from the one, just described above, of the embodiment of FIGS. 1 and 2.

With reference now to the FIGS. 4 and 5 a handlebar 111 is described, realised according to two variants of a third embodiment of the present invention.

The handlebar 111 has a portion 125 substantially at the centre of each intermediate section 119,121 to which it is fixed a clamp 151 provided with a bracket 153 and with a fixing element, for instance a screw or a bolt 155, for fixing a transversal strengthening bar or crossbar 157 arranged substantially parallel to the central section 113.

Since said portion 125 is conical and presents a diameter decreasing as one moves away from the central section 113, the clamp 151 correspondingly presents an internal section with complementary taper in order to adapt itself to the taper of said central portion 125.

Alternatively, according to a variant of said third embodiment of the present invention, it is provided that said central portion 125 is realised cylindrical. Advantageously, in this way said portion 125, being cylindrical at constant diameter, constitutes a zone suitable for fixing a clamp 151 of standard type with an inner section which is also cylindrical. In this case, the intermediate sections 119,121 will have two conical sections at their ends, that link themselves from the one side to the cylindrical portion 125 and to the other side to the inner 124 and external 126 bending zones respectively. The cylindrical portion 125 will be in this way comprised between the two conical sections.

The handlebar according to this embodiment of the present invention, thus having variable thickness and diameter and provided with a crossbar 157, turns out to be particularly suitable to be employed in protracted hard conditions and in all those cases where it is necessary a support to which steadily anchor auxiliary instruments like for instance the instruments necessary during the motorcycle rallies.

The non limiting embodiments above described can be subject to various modifications and changes without departing from the scope of the present invention. More generally the tubular fixed sleeve 263 can be replaced, on one or both the ends of the light alloy tube, with a layer of a sliding material harder and more abrasion resistant than the light alloy of the tube. Such harder layer can be made for example by thermal—or electrochemical treatments of the light alloy tube.

The disclosure in the European patent Application No. 04425173.4, filed on 15 Mar. 2004 and from which this application claims priority, is incorporated herein by reference.

The invention claimed is:

1. Handlebar for cycles or motorcycles comprising:
a light alloy tube to an end of which a twist grip of the motorcycle accelerator can be set, wherein said end is externally covered by a layer of sliding material substantially harder and more abrasion resistant than said light alloy of said tube, wherein said layer of sliding material comprises a tubular fixed sleeve fitted on said end of the tube; and
a twist grip disposed rotating on and around said tubular fixed sleeve for driving a motorcycle accelerator;
wherein said end of the light alloy tube comprises a fitting seat on which said fixed sleeve is fitted, and an axial shoulder against which said tubular fixed sleeve rests when fitted on said end of the light alloy tube.

2. Handlebar according to claim 1, wherein said light alloy is an aluminium alloy.

3. Handlebar according to claim 1, wherein said sliding material is chosen from the group consisting of: steel, stainless steel, titanium alloy, and a composite material.

4. Handlebar according to claim 1, wherein said fitting seat has a substantially cylindrical shape and a diameter substantially smaller than at least an inner diameter of a length of the light alloy tube adjacent to the fitting seat.

5. Handlebar according to claim 1, wherein said fitting seat is made at least by turning.

6. Handlebar according to claim 1, wherein said tubular fixed sleeve is fixed to the tube at least by gluing.

7. Handlebar according to claim 1, wherein said tubular fixed sleeve is at least 100 mm long.

8. Handlebar for motorcycles according to claim 1, wherein said light alloy tube has substantially constant cross-sections along its length.

9. Method for manufacturing a handlebar according to claim 1, comprising the step of fixing said tubular fixed sleeve on at least an end of said light alloy tube at least by gluing.

10. Method for manufacturing a handlebar according to claim 1, comprising the step of making said fitting seat at least by turning.

11. Handlebar for cycles or motorcycles, comprising:
a light alloy tube to an end of which a twist grip of the motorcycle accelerator can be set, wherein said end is externally covered by a layer of sliding material substantially harder and more abrasion resistant than said light alloy of said tube, wherein said layer of sliding material comprises a tubular fixed sleeve fitted on said end of the tube;
wherein said light alloy tube is bent so as to define: a median section comprising a central portion having a diameter $d_{23}$ and a thickness $s_{23}$ for fixing the handlebar; two end sections, each of them comprising a central portion having a diameter $d_{27}$ and a thickness $s_{27}$ for holding the handlebar; and two intermediate sections, each of them comprising a central portion having a diameter $d_{25}$ and a thickness $s_{25}$ linking to said median section in an internal bending zone and to a respective one of said end sections in an external bending zone having a thickness $s_{26}$; said handlebar diameters and thicknesses varying according to the following formulae:

$$d_{23} > d_{25} > d_{27}$$

and $$s_{26} > s_{23} > s_{25} > s_{27}.$$

12. Handlebar for motorcycles according to claim 11, wherein said respective end sections each has a diameter $d_{29}$ and a thickness $s_{29}$ and wherein $s_{25} > s_{29} > s_{27}$ and $d_{29} \cong d_{27}$.

13. Handlebar for motorcycles according to claim 12, wherein said two intermediate linking sections are tapered and have a diameter continuously decreasing from the median section towards the respective end sections.

14. Handlebar for motorcycles according to claim 13, wherein said bent tube has a thickness $s_{26} \cong 5.2$ mm, $s_{23} \cong 4.5$ mm, $s_{25} \cong 4.2$ mm, $s_{29} \cong 4.0$ mm and $s_{27} \cong 2.8$ mm.

15. Handlebar for motorcycles according to claim 12, wherein said bent tube has a diameter $d_{23}$ of about 2.8 mm and a diameter $d_{27}$ of about 22 mm, the diameter $d_{25}$ being intermediate between 2.8 mm and 22 mm.

16. Handlebar for motorcycles according to claim 11, wherein each of said intermediate sections comprises a cylindrical portion having a constant diameter substantially at the centre of each intermediate section for fixing a clamp having a cylindrical inner section, said clamp being provided with a bracket and with a fixing element for fixing a transversal strengthening bar or crossbar arranged substantially parallel to the median section.

17. Handlebar for motorcycles according to claim 11, wherein each of said intermediate sections comprises a conical portion substantially at the centre of each intermediate section, the diameter of said conical portion decreasing as one moves away from said median section for fixing a clamp having a conical inner section complementary to the inner section of said conical portion, said clamp being provided with a bracket and being provided with a fixing element for fixing a transversal strengthening bar or crossbar arranged substantially parallel to the central section.

18. Handlebar for motorcycles according to claim 11, wherein said handlebar is provided in at least one of the end sections with a cylindrical seat, defined by a section having a smaller diameter, for inserting a tubular fixed sleeve, preferably made of stainless steel or of composite material, for assuring a higher sliding of the throttle control.

19. Handlebar for motorcycles according to claim 18, wherein said tubular fixed sleeve has a thickness substantially equal to the depth of said seat so that the handlebar is without steps on the external surface of said end section provided with a seat.

* * * * *